(12) United States Patent
Chen et al.

(10) Patent No.: US 8,677,050 B2
(45) Date of Patent: Mar. 18, 2014

(54) SYSTEM, METHOD AND COMPUTER PROGRAM PRODUCT FOR EXTENDING A CACHE USING PROCESSOR REGISTERS

(75) Inventors: Wen-Tzer T. Chen, Austin, TX (US); Diane G. Flemming, Pflugerville, TX (US); William A. Maron, Austin, TX (US); Mysore S. Srinivas, Austin, TX (US); David B. Whitworth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 12/945,354

(22) Filed: Nov. 12, 2010

(65) Prior Publication Data

US 2012/0124299 A1 May 17, 2012

(51) Int. Cl.
*G06F 12/00* (2006.01)
(52) U.S. Cl.
USPC .......... 711/3; 711/2; 711/118; 711/154; 711/E12.017; 711/E12.042
(58) Field of Classification Search
None
See application file for complete search history.

(56) References Cited

U.S. PATENT DOCUMENTS

| | | | | |
|---|---|---|---|---|
| 4,797,814 A * | 1/1989 | Brenza | | 711/122 |
| 5,481,683 A * | 1/1996 | Karim | | 712/217 |
| 6,016,542 A * | 1/2000 | Gottlieb et al. | | 712/225 |
| 6,199,156 B1 | 3/2001 | Yoder et al. | | |
| 6,408,313 B1 * | 6/2002 | Campbell et al. | | 711/170 |
| 6,779,088 B1 * | 8/2004 | Benveniste et al. | | 711/144 |
| 7,117,308 B1 * | 10/2006 | Mitten et al. | | 711/144 |
| 7,127,592 B2 | 10/2006 | Abraham et al. | | |
| 7,200,741 B1 * | 4/2007 | Mine | | 712/244 |
| 7,404,070 B1 * | 7/2008 | Patil et al. | | 712/239 |
| 7,676,646 B2 | 3/2010 | Cohen | | |
| 2004/0034745 A1 * | 2/2004 | Hameed | | 711/135 |
| 2007/0214302 A1 * | 9/2007 | Kubo et al. | | 710/305 |
| 2008/0126771 A1 * | 5/2008 | Chen et al. | | 712/238 |
| 2011/0173395 A1 * | 7/2011 | Bhattacharjee et al. | | 711/135 |
| 2012/0060015 A1 * | 3/2012 | Eichenberger et al. | | 711/118 |

FOREIGN PATENT DOCUMENTS

JP 2007304663 11/2007

OTHER PUBLICATIONS

"User's Manual: S3CC410 16-Bit CMOS Microcontroller," Rev. 0, Samsung Electronics, Jan. 2004 [Datasheet Archive], retrieved by Internet Archive Wayback Machine, Mar. 20, 2006. <http://web.archive.org/web/20060320231545/http://www.donat.org/archos/documents/S3cc410.pdf>.*
IBM. "Dynamic Set Size Extender for Cache." IBM Technical Disclosure Bulletin, Nov. 1991.*
Teodorescu-et al.; "Swich: A Prototype for Efficient Cache-Level Checkpointing and Rollback"; Google/IEEE; 2006.

(Continued)

*Primary Examiner* — Alford W. Kindred
*Assistant Examiner* — Daniel Bernard
(74) *Attorney, Agent, or Firm* — James L. Baudino; Matthew B. Talpis

(57) ABSTRACT

According to one aspect of the present disclosure, a method and technique for using processor registers for extending a cache structure is disclosed. The method includes identifying a register of a processor, identifying a cache to extend, allocating the register as an extension of the cache, and setting an address of the register as corresponding to an address space in the cache.

24 Claims, 3 Drawing Sheets

(56) References Cited

OTHER PUBLICATIONS

Oehmke-et al.; "How to Fake 1000 Registers"; Google; Nov. 2005.
Cranor-et al.; "Architectural Considerations for CPU and Network Interface Integration"; Google: Jan.-Feb. 2000.
Langston-et al.; "Multi-core Processors and Caching—A Survey"; Google; Aug. 2007.
Jones-et al.; "Energy-Efficient Register Caching with Compiler Assistance"; ACM Transactions on Architecture and Code Optimization; vol. 6, No. 4, Article 13; Oct. 2009.
Yan-et al.; "Exploiting Virtual Registers to Reduce Pressure on Real Registers"; ACM Transactions on Architecture and Code Optimization; vol. 4, No. 4, Article 22; Jan. 2008.

\* cited by examiner

SYSTEM, METHOD AND COMPUTER PROGRAM PRODUCT FOR EXTENDING A CACHE USING PROCESSOR REGISTERS

BACKGROUND

Processors contain a variety of different functional units, registers and cache structures for executing instructions and storing various types of data, such as a fixed-point unit, a floating-point unit, an integer unit, a data cache, an instruction cache, a fetch unit, and others. Generally, a greater quantity and/or larger size of certain cache structures is desired to accommodate certain performance goals or requirements. However, because of limited resource availability on a processor structure, increasing a size of one cache structure may result in decreasing a size of another cache structure or decreasing the performance of the data processing system.

BRIEF SUMMARY

According to one aspect of the present disclosure a method and technique for extending a cache structure using processor registers is disclosed. The method includes identifying a register of a processor, identifying a cache to extend, allocating the register as an extension of the cache, and setting an address of the register as corresponding to an address space in the cache.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
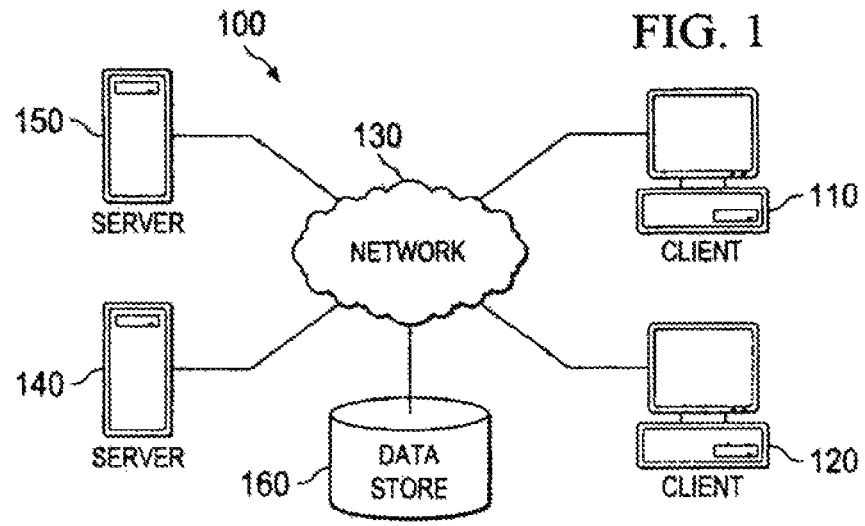
FIG. 1 is an embodiment of a network of data processing systems in which the illustrative embodiments of the present disclosure may be implemented.

Embodiments of the present disclosure provide a method, system and computer program product for extending a cache structure using processor registers. For example, in some embodiments, the method and technique includes identifying a register of a processor, identifying a cache to extend, allocating the register as an extension of the cache, and setting an address of the register as corresponding to an address space in the cache. In some embodiments, based on usage or non-usage of registers of the processor, certain registers of the processor are used as an extended cache storage space.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
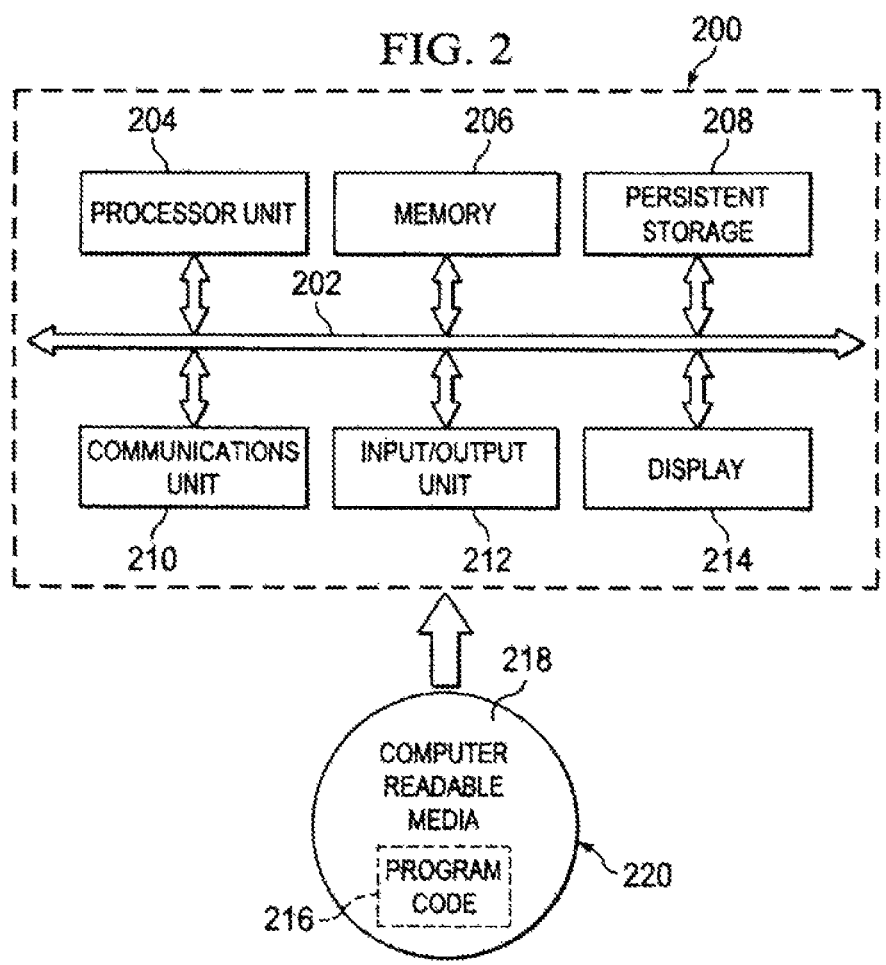
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System p® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a data transfer management system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
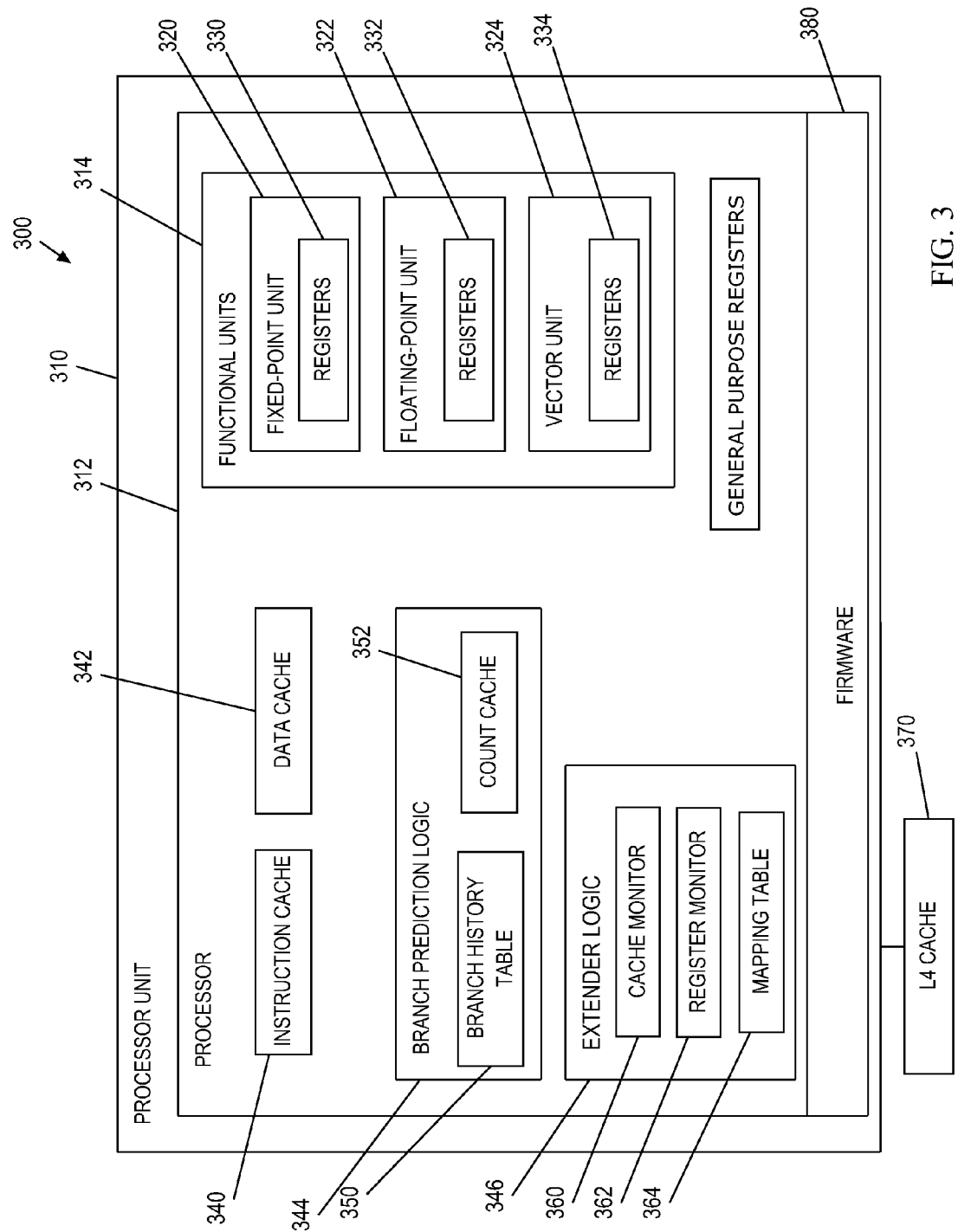
FIG. 3 is a diagram illustrating an embodiment of a data processing system in which illustrative embodiments of a cache extension system may be implemented.

FIG. 3 is an illustrative embodiment of a system 300 for using a register of a processor as an extension of cache. System 300 may be implemented on a data processing system or platform such as, but not limited to, servers 140 and/or 150, clients 110 and/or 120, or at other data processing system locations. In the embodiment illustrated in FIG. 3, system 300 comprises a processor unit 310 having a processor 312 including one or more functional units 314. Functional units 314 may include a variety of different types of units for executing various types of instructions of various types of applications. In FIG. 3, processor 312 includes a fixed-point unit 320, a floating-point unit 322 and a vector unit 324. It should be understood that the quantity and/or types of functional units 314 on processor 312 may vary. Each functional unit 314 may each include one or more registers for storing data, instructions, etc. For example, as illustrated in FIG. 3, fixed-point unit 320, floating-point unit 322 and vector unit 324 each include one or more registers 330, 332 and 334 respectively. Processor 312 may also include general purpose registers 338.

In the embodiment illustrated in FIG. 3, processor 312 also includes an on-board instruction cache 340, a data cache 342, branch prediction logic 344 and extender logic 346. It should be understood that processor 312 may include additional elements and/or units such as, but not limited to, an instruction fetch unit, an instruction decode unit, an issue unit, etc. Instruction cache 340, data cache 342, branch prediction logic 344 and extender logic 346 are referred to as "on-board" since they are integrally packaged with functional units 314 and various registers (e.g., registers 330, 332, 334 and 338). Branch prediction logic 344 and extender logic 346 may comprise software, logic and/or executable code for performing various functions as described herein (e.g., residing as software and/or an algorithm running on processor unit 310, hardware logic residing in processor 312, etc.). In FIG. 3, branch prediction logic 344 includes a branch history table (BHT) 350 and a count cache 352. BHT 350 may include entries corresponding to various possible instruction branches and counters representing a value used for making a prediction (taken/not taken) for a conditional branch instruction. Count cache 352 may include a value representing the number of instances a particular branch is encountered. Thus, branch prediction logic 344 uses various statistical information obtained and represented in BHT 350 and count cache 352 to predict (take/not take) a particular conditional instruction branch.

Extender logic 346 is used to allocate one or more registers of processor 312 as a cache entry space, thereby virtually extending the storage capacity of a particular cache structure. For example, in some embodiments, extender logic includes a cache monitor 360, a register monitor 362, and a mapping table 364. Cache monitor 360 is used to monitor and/or gather various types of statistical information associated with usage of one or more cache structures. For example, cache monitor 360 may monitor usage of on-board cache structures, such as count cache 352, data cache 342, instruction cache 340, and/or may monitor and/or otherwise obtain information associated with off-board cache structures, such as an off-board level four (L4) cache 370. Cache monitor 360 may also compare usage of a particular cache structure to a predefined threshold to determine whether additional cache entry space is needed for the particular cache structure. For example, in some embodiments, if a particular program is instruction branch-intensive, additional entry space in BHT 350 and/or count cache 352 may be needed to better predict branch targets. Thus, for instance, if usage of a particular cache meets or exceeds a particular threshold, cache monitor 360 may identify the particular cache as a candidate for extension to use one or more registers of processor 312 as additional cache entry space. Similarly, if a particular cache structure is utilizing one or more registers of processor 312 as additional cache entry space and usage of the cache structure decreases to the threshold or below, cache monitor 360 may identify the particular cache structure as no longer needing the register space, thereby enabling the de-allocation of the particular registers from extended cache usage. It should also be understood that cache monitor 360 may receive a selection of a particular cache structure for extension (e.g., by a system administrator or other user via an input/output unit or other type of user interface).

Register monitor 362 monitors and/or otherwise gathers various statistical information associated with usage of the various registers of processor 312. For example, in some embodiments, register monitor 362 may acquire address information for each available register on processor 312 and monitor register usage by one or more program applications over certain periods of time to determine which registers are being used and which registers are not being used. Based on the usage statistics of the various available registers on processor 312, register monitor 362 may identify certain registers of processor 312 as candidates to use as an extension to a cache. In some embodiments, register monitor may acquire address information for each available register on processor 312 and certain registers of processor 312 may be allocated for a cache extension independently of usage statistics.

Mapping table 364 contains information associated with the mapping of certain registers of processor 312 to certain cache structures. For example, in some embodiments, mapping table 364 may include information correlating addresses of certain registers to a virtual address as a cache entry space of a certain cache structure.

Thus, in operation, based on usage statistics, selection by a user or system administrator, or otherwise, extender logic 346 identifies and allocates one or more registers of processor 312 as a cache extension, thereby using available registers of processor 312 as overflow storage for information that would be otherwise stored in a particular cache structure or evicted. Extender logic 346 also interfaces with firmware 380 of processor unit 310 to cause an address of the selected cache extension register to be set as a virtual address corresponding to the assigned cache structure. Thus, firmware 380 causes the selected cache extension registers to be unavailable to or hidden from a compiler or other application use. The cache extending register may be used as an overflow storage space or may be used as an initial or first-used storage space corresponding to a certain cache structure. For example, in some embodiments, if the address "n" represents the end of or last cache entry space of a cache structure, extender logic 346 may cause the address of a certain register to be set or mapped to an address "n+1" to correspond to a next available cache entry space in the cache structure. However, in some embodiments, the cache extending registers may be used as the initial cache entry spaces, thereby causing cache-destined information to be stored in the cache extending registers before utilizing the entry spaces of the actual cache structure.

Thus, as an illustrative example, consider the extension of count cache 352 using one or more registers of processor 312. In some embodiments, count cache 352 may be identified for extension based on usage statistics of count cache 352 (e.g., by monitoring the capacity and usage of that capacity by cache monitor 360) or may be selected for extension by a user or system administrator. In some embodiments, extender logic 346 monitors the usage of various registers of processor 312 to identify certain registers of processor 312 as candidates for an extension to count cache 352. For example, if a particular application program utilizes a significant quantity of floating-point unit registers 332 but few or none of vector unit registers 334, one or more vector unit registers 334 may be identified and selected as candidates for an extension to count cache 352. It should also be understood that the extension registers may include registers associated with different functional units 314 or otherwise. For example, extender logic 346 may identify one or more fixed-point unit registers 330, one or more vector unit registers 334 and one or more general purpose registers 338 as cache extension spaces for count cache 352.

Extender logic 346 interfaces with firmware 380 to cause the addresses of selected or allocated cache extension registers to set or mapped to correspond to an address space of count cache 352. For example, firmware 380 causes the cache extension allocated registers to be hidden or otherwise unavailable to other system components.

Extender logic 346 may also be configured to dynamically allocate and de-allocate certain registers for cache extension. For example, consider that certain floating-point unit registers 332 have been allocated as an extension to count cache 352. Responsive to increased use of non-allocated floating-point unit registers 332 by a program or application meeting or exceeding a predefined threshold, extender logic 346 may de-allocate the extension floating-point unit registers 332 from count cache 352 and allocate other registers to count cache 352. Further, extender logic 346 may de-allocate the extension floating-point unit registers 332 from count cache 352 based on usage, or the lack of usage, of extension registers. For example, if use of count cache 352 decreases to or below a predefined threshold such that the use of extension registers is no longer needed, extender logic 346 may de-allocate the extension registers from count cache 352. In this case, extender logic 346 interfaces with firmware 380 to enable firmware 380 to re-assign the address space of the de-allocated registers from the cache structure to other use.

Figure 4:
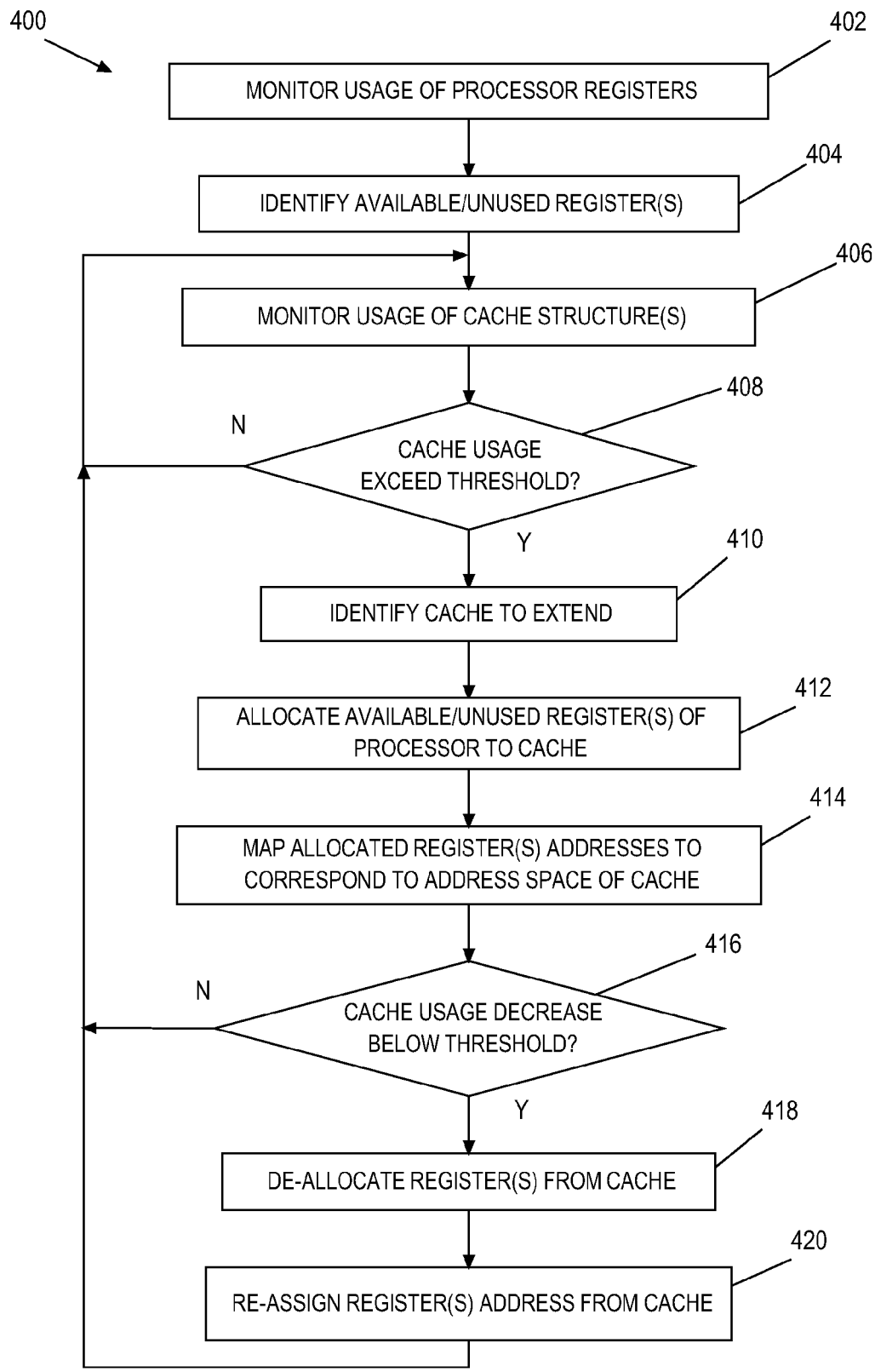
FIG. 4 is a flow diagram illustrating an embodiment of a cache extension method.

FIG. 4 is a flow diagram illustrating an embodiment of a method for using processor registers as extended cache entry space. The method begins at block 402, where register monitor 362 monitors usage of one or more registers of processor 312. At block 404, register monitor 362 identifies one or more registers of processor 312 as candidates for a cache extension space. At block 406, cache monitor 360 monitors usage of one or more cache structures. At decisional block 408, a decision is made whether usage of a particular cache structure has exceeded a predefined threshold. If not, the method proceeds to block 406 where cache monitor 360 continues to monitor usage of cache structures. If so, the method proceeds to block 410, where cache monitor 360 identifies one or more cache structures for extension.

At block 412, extender logic 346 allocates available and/or unused registers of processor 312 to an identified cache structure. At block 414, extender logic 346 interfaces with firmware 380 to cause the addresses of the allocated registers to be mapped to correspond to an entry space of the designated cache structure.

At decisional block 416, a determination is made whether cache usage has decreased to below a predefined threshold. If not, the method proceeds to block 406 where cache monitor 360 continues to monitor usage of the cache structure. If so, the method proceeds to block 418, where the extended cache registers are de-allocated from the corresponding cache structure. At block 420, extender logic 346 interfaces with firmware 380 to cause the address of the de-allocated register to be re-assigned from the indicated cache structure.

Thus, embodiments of the present disclosure enable usage of various processor registers to be used as a cache structure entry space. Embodiments of the present disclosure enable dynamic allocation and de-allocation of register processors as extensions of cache structures based on usage levels of the cache structures and/or based on usage of different registers of the processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
identifying a register of a processor;
identifying a cache to extend;
allocating the register as an extension of the cache; and
setting an address of the register as corresponding to an address space in the cache.

2. The method of claim 1, further comprising:
monitoring usage of the cache; and
responsive to determining that usage of the cache reaches a threshold, identifying the cache for extension.

3. The method of claim 1, further comprising:
monitoring usage of the register of the processor; and
responsive to non-usage of the register of the processor, identifying the register of the processor as a candidate for a cache extension.

4. The method of claim 1, wherein identifying a cache to extend comprises identifying a processor cache of the processor to extend.

5. The method of claim 1, wherein extending a cache to extend comprises extending a count cache of the processor.

6. The method of claim 1, further comprising:
monitoring usage of an extended cache; and
responsive to determining that usage of the extended cache has decreased below a threshold, de-allocating the register from the extended cache.

7. The method of claim 1, wherein identifying a cache to extend comprises receiving a selection of the cache via an input/output unit.

8. A system comprising:
a processor having a plurality of registers; and
extender logic configured to identify at least one of the plurality of registers to allocate as an extension of a cache, the extender logic configured to cause an address of the at least one register to be set as corresponding to an address space in the cache.

9. The system of claim 8, wherein the extender logic is configured to:
monitor usage of the cache; and
responsive to determining that usage of the cache reaches a threshold, identify the cache for extension.

10. The system of claim 8, wherein the extender logic is configured to:
monitor usage of the register of the processor; and
responsive to non-usage of the register of the processor, identify the register of the processor as a candidate for a cache extension.

11. The system of claim 8, wherein the extender logic is configured to identify a processor cache to extend.

12. The system of claim 8, wherein the extender logic is configured to extend a count cache of the processor.

13. The system of claim 8, wherein the extender logic is configured to:
monitor usage of an extended cache; and
responsive to determining that usage of the extended cache has decreased below a threshold, de-allocating the register from the extended cache.

14. The system of claim 8, wherein the extender logic is configured to receive a selection of the cache to extend via an input/output unit.

15. A computer program product for using a processor register as an extended cache, the computer program product comprising:
a computer readable storage medium having computer readable program code embodied therewith, the computer readable program code comprising computer readable program code configured to:
identify a register of a processor;
identify a cache to extend;
allocate the register as an extension of the cache; and
set an address of the register as corresponding to an address space in the cache.

16. The computer program product of claim 15, wherein the computer readable program code is configured to:
monitor usage of the cache; and
responsive to determining that usage of the cache reaches a threshold, identify the cache for extension.

17. The computer program product of claim 15, wherein the computer readable program code is configured to:
monitor usage of the register of the processor; and
responsive to non-usage of the register of the processor, identify the register of the processor as a candidate for a cache extension.

18. The computer program product of claim 15, wherein the computer readable program code is configured to identify a processor cache of the processor to extend.

19. The computer program product of claim 18, wherein the computer readable program code is configured to extend a count cache of the processor.

20. The computer program product of claim 18, wherein the computer readable program code is configured to:
monitor usage of an extended cache; and
responsive to determining that usage of the extended cache has decreased below a threshold, de-allocating the register from the extended cache.

21. A method comprising:
determining usage of a plurality of registers of a processor;
responsive to determining usage of the plurality of registers, identifying at least one of the plurality of registers as a candidate for extending a cache; and
setting an address of the candidate register to correspond to an address space of the cache.

22. The method of claim 21, further comprising identifying a processor cache to extend.

23. The method of claim 21, further comprising:
monitoring usage of the extended cache; and
responsive to determining that usage of the extended cache has decreased below a threshold, de-allocating the register from the cache.

24. The method of claim 21, further comprising extending a count cache of the processor.

* * * * *